US012640135B2

(12) United States Patent
Mori et al.

(10) Patent No.: US 12,640,135 B2
(45) Date of Patent: May 26, 2026

(54) ACOUSTIC LENS, METHOD FOR MANUFACTURING SAME, ULTRASOUND PROBE, AND ULTRASONOGRAPHIC DEVICE

(71) Applicant: KONICA MINOLTA, INC., Tokyo (JP)

(72) Inventors: Hajime Mori, Fuchu (JP); Kiyokazu Morita, Kokubunji (JP)

(73) Assignee: KONICA MINOLTA, INC., Tokyo (JP)

( * ) Notice: Subject to any disclaimer, the term of this patent is extended or adjusted under 35 U.S.C. 154(b) by 196 days.

(21) Appl. No.: 18/252,638

(22) PCT Filed: Oct. 1, 2021

(86) PCT No.: PCT/JP2021/036459
§ 371 (c)(1),
(2) Date: May 11, 2023

(87) PCT Pub. No.: WO2022/102276
PCT Pub. Date: May 19, 2022

(65) Prior Publication Data

US 2024/0013766 A1 Jan. 11, 2024

(30) Foreign Application Priority Data

Nov. 13, 2020 (JP) ................................ 2020-189058

(51) Int. Cl.
*G10K 11/30* (2006.01)
*A61B 8/00* (2006.01)
*G10K 11/26* (2006.01)

(52) U.S. Cl.
CPC .................................. *G10K 11/30* (2013.01)

(58) Field of Classification Search
CPC .... A61B 8/00; A61B 8/15; A61B 8/12; A61B 8/4281; A61B 8/42; A61B 8/4272;
(Continued)

(56) References Cited

U.S. PATENT DOCUMENTS 4,205,686 A * 6/1980 Harris .................. G01N 29/221 73/644
4,699,150 A * 10/1987 Kawabuchi ............ G10K 11/02 73/644
(Continued)

FOREIGN PATENT DOCUMENTS

CN 106971708 A * 7/2017 ......... G01N 29/0672
JP S58216294 A 12/1983
(Continued)

OTHER PUBLICATIONS

International Preliminary Report on Patentability (Form PCT/IB/373) and the Written Opinion of the International Searching Authority (Form PCT/ISA/237) issued on May 16, 2023, in the corresponding International Application No. PCT/JP2021/036459 with translation. (10 pages).
(Continued)

*Primary Examiner* — Edgardo San Martin
(74) *Attorney, Agent, or Firm* — .Buchanan Ingersoll & Rooney PC

(57) ABSTRACT

An acoustic lens of an ultrasound probe includes: a concave lens portion and a convex lens portion that are joined to each other. A propagation speed of an ultrasonic wave in the convex lens portion is slower than a propagation speed of an ultrasonic wave in the concave lens portion. An acoustic impedance of a lens portion on a side of a subject of the concave lens portion and the convex lens portion is within a range of 1.3 to 1.8 MRayl. A material of the concave lens
(Continued)

portion is a thermoplastic resin, and a material of the convex lens portion is a thermoplastic resin.

13 Claims, 3 Drawing Sheets

(58) Field of Classification Search
CPC ....... A61B 8/44; A61B 8/4483; A61B 8/4444; A61B 8/4494; G01N 29/00; G01N 29/24; G01N 29/2437; G01N 29/2456; G10K 11/30; G10K 11/26; G10K 11/18; H04R 1/34; H04R 17/00
See application file for complete search history.

(56) References Cited

U.S. PATENT DOCUMENTS

| | | | | |
|---|---|---|---|---|
| 5,050,128 | A * | 9/1991 | Saitoh | G10K 11/02 600/459 |
| 5,505,205 | A * | 4/1996 | Solomon | G10K 11/30 600/459 |
| 8,102,734 | B2 * | 1/2012 | Sliwa | A61B 8/4272 367/140 |
| 9,221,077 | B2 * | 12/2015 | Chen | G10K 11/18 |
| 11,041,951 | B2 * | 6/2021 | Beers | B06B 3/00 |
| 11,052,425 | B2 * | 7/2021 | Fukase | A61B 8/4444 |
| 11,386,883 | B2 * | 7/2022 | Dirksen | A61B 8/4494 |
| 11,723,625 | B2 * | 8/2023 | Spigelmyer | G01S 15/8915 600/443 |
| 2019/0180728 | A1 | 6/2019 | Alie et al. | |

FOREIGN PATENT DOCUMENTS

| | | | |
|---|---|---|---|
| JP | H06254100 | A * | 9/1994 |
| JP | 2004105741 | A | 4/2004 |
| JP | 2009247416 | A | 10/2009 |
| JP | 2019504547 | A | 2/2019 |
| JP | 2019187868 | A | 10/2019 |
| JP | 2020512023 | A | 4/2020 |

OTHER PUBLICATIONS

International Search Report (PCT/ISA/210) with translation and Written Opinion (PCT/ISA/237) mailed on Dec. 14, 2021, by the Japanese Patent Office as the International Searching Authority for International Application No. PCT/JP2021/036459. (9 pages).
Office Action (Notice of Reasons for Refusal) issued on Apr. 22, 2025, by the Japanese Patent Office in corresponding Japanese Patent Application No. 2022-561320, and an English Translation of the Office Action. (8 pages).
Office Action (First Office Action) issued on Jan. 29, 2026, by the Chinese Patent Office in corresponding Chinese Patent Application No. 202180075475.5, and an English Translation of the Office Action. (17 pages).

* cited by examiner

ACOUSTIC LENS, METHOD FOR MANUFACTURING SAME, ULTRASOUND PROBE, AND ULTRASONOGRAPHIC DEVICE

TECHNICAL FIELD

The present invention relates to an acoustic lens, a method for manufacturing the same, an ultrasound probe, and an ultrasonographic device.

More specifically, the present invention relates to an acoustic lens in which attenuation of sound is small and whose acoustic impedance is appropriate for an ultrasound probe.

BACKGROUND ART

Conventionally, in an ultrasound probe of an ultrasonographic device, an acoustic lens is used for the purpose of improving the resolution of an obtained image.

The acoustic lens is a medium for converging or diverging acoustic waves. It is possible to converge or diverge a sound wave by using an acoustic lens in which a difference between a propagation speed of a sound wave in the acoustic lens (hereinafter, also referred to as a "sound speed") and a propagation speed of a sound wave in a surrounding substance and a shape of the lens are appropriately adjusted. In the ultrasound probe, an acoustic lens that focuses ultrasonic waves in a slice direction is used.

An acoustic lens for an ultrasound probe is required to satisfy a condition for focusing ultrasonic waves and to have an acoustic impedance close to the acoustic impedance of a subject. When the acoustic impedance of the acoustic lens is close to the acoustic impedance of the subject, the reflection of ultrasonic waves at an interface between the acoustic lens and the subject can be reduced. Examples of the conditions for the acoustic lens to focus the ultrasonic waves include an appropriate acoustic velocity in the acoustic lens and an appropriate shape of the acoustic lens. Further, the acoustic lens is required to have a small sound attenuation (acoustic propagation attenuation) in order to increase the sensitivity of the ultrasound probe.

As a conventional technology, there is a convex acoustic lens using a fine particle-filled silicone rubber as a material (Patent Document 1). The fine particle-filled silicone rubber is excellent as a material for the convex acoustic lens in that silicone rubber has a suitable sound velocity and that the acoustic impedance is adjusted by being filled with fine particles of silica or the like. However, the fine particle-filled silicone rubber has a disadvantage that sound is greatly attenuated due to the fine particles.

Patent Document 2 and Patent Document 3 disclose composite acoustic lenses in which attenuation of sound is suppressed. According to Patent Document 2, the overall thickness of the composite acoustic lens is reduced by combining a concave lens portion having a high acoustic velocity with a convex lens portion using silicone rubber. The composite acoustic lens of Patent Document 3 does not use a fine particle-filled silicone rubber.

However, the composite acoustic lens using the technology as described above includes a thermosetting resin as a material of at least one of the lens portions. Therefore, these composite acoustic lenses have poor joining properties between the lens portions, and are very difficult to manufacture in practice. Therefore, development of an acoustic lens using a material having a good joining property has been demanded.

CITATION LIST

Patent Literature

Patent Document 1: Japanese Unexamined Patent Publication No. S 58-216294

Patent Document 2: Japanese Examined Patent Publication No. H 7-63465

Patent Document 3: Japanese Translation of PCT International Publication 2019-504547

SUMMARY OF INVENTION

Technical Problem

The present invention was made in view of the above problems and circumstances, and the problem to be solved by the present invention is to provide an acoustic lens in which attenuation of sound is small and acoustic impedance is appropriate for an ultrasound probe, a method of manufacturing the acoustic lens, and an ultrasound probe and an ultrasonographic device including the acoustic lens.

Solution to Problem

In order to solve the above problems, the inventors of the present invention examined a cause of the above problems. As a result, the present inventors have found that in an acoustic lens formed by joining a concave lens portion and a convex lens portion, the above-described problem can be solved by using a thermoplastic resin as a material of any of the lens portions, and have arrived at the present invention.

That is, the aforementioned problems according to the present invention are solved by the following means.

1. An acoustic lens of an ultrasound probe, including:

a concave lens portion and a convex lens portion that are joined to each other, wherein a propagation speed of an ultrasonic wave in the convex lens portion is slower than a propagation speed of an ultrasonic wave in the concave lens portion, wherein an acoustic impedance of a lens portion on a side of a subject of the concave lens portion and the convex lens portion is within a range of 1.3 to 1.8 MRayl, and wherein a material of the concave lens portion is a thermoplastic resin, and a material of the convex lens portion is a thermoplastic resin.

2. The acoustic lens according to item 1, wherein a lens surface facing the subject of the acoustic lens disposed in an ultrasound probe is a flat surface or a convex surface.

3. The acoustic lens according to item 1 or 2, wherein a propagation speed of an ultrasonic wave through the convex lens portion is slower than a propagation speed of an ultrasonic wave through the concave lens portion by 300 m/s or more.

4. The acoustic lens according to any one of items 1 to 3, wherein a thermoplastic resin as a material of the concave lens portion is a thermoplastic hard resin, and a thermoplastic resin as a material of the convex lens portion is a thermoplastic elastomer.

5. The acoustic lens according to any one of items 1 to 4, wherein a repulsive elastic modulus of a thermoplastic resin as a material of the convex lens portion is 60% or more.

6. The acoustic lens according to any one of items 1 to 5, wherein a difference in solubility parameter between at least one component contained as a material of the concave lens portion and at least one component contained as a material of the convex lens portion is 1 $(cal/cm^3)^{1/2}$ or less.

7. The acoustic lens according to any one of items 1 to 6, wherein the concave lens portion and the convex lens portion are welded.

8. The acoustic lens according to any one of items 1 to 7, wherein the concave lens portion is configured to face the subject, wherein the convex lens portion is configured to face an ultrasound transducer, wherein a thermoplastic resin as a material of the concave lens portion is a polyolefin-based thermoplastic hard resin, and wherein a thermoplastic resin as a material of the convex lens portion is a thermoplastic elastomer containing a polyolefin-based resin component.

9. The acoustic lens according to any one of items 1 to 7, wherein the concave lens portion is configured to face an ultrasound transducer, wherein the convex lens portion is configured to face the subject, wherein a thermoplastic resin as a material of the concave lens portion is a thermoplastic hard resin of a polycarbonate-based resin, an ABS-based resin, a polybutylene terephthalate-based resin, and a polyamide-based resin, and wherein a thermoplastic resin as a material of the convex lens portion is a thermoplastic elastomer containing at least one resin component of a polyester-based resin, a polyimide based resin, and a polyurethane-based resin.

10. A method for manufacturing the acoustic lens according to any one of items 1 to 9, the method including:

welding of the concave lens portion and the convex lens portion to each other.

11. The method for manufacturing the acoustic lens according to item 10, wherein the concave lens portion and the convex lens portion are welded to each other by insert molding.

12. The method for manufacturing the acoustic lens according to item 10, wherein the concave lens portion and the convex lens portion are welded to each other by two color molding.

13. An ultrasound probe including: an ultrasound transducer that transmits an ultrasonic wave toward a subject and receives an reflected echo from the subject; and an acoustic lens that is arranged facing a transmission/reception surface of the ultrasound transducer;

wherein the acoustic lens is the acoustic lens according to any one of items 1 to 9.

14. An ultrasonographic device including the ultrasound probe according to item 13.

Advantageous Effects of Invention

By the above-described means of the present invention, it is possible to provide an acoustic lens in which the attenuation of sound is small and the acoustic impedance is suitable for an ultrasound probe, a method of manufacturing the acoustic lens, and an ultrasound probe and an ultrasonographic device including the acoustic lens.

An expression mechanism or an action mechanism of the effects of the present invention is not clear, but is assumed as follows.

A conventional lens has a convex lens shape and is made of fine particle-filled silicone rubber that greatly attenuates sound to obtain an acoustic impedance (within a range of 1.3 to 1.8 MRayl) close to a subject. On the other hand, the acoustic lens of the present invention satisfies the shape requirement with a combination of a concave lens portion in which the sound velocity is fast and a convex lens portion in which the sound velocity is slow, and satisfies the acoustic impedance requirement with the lens on the subject side. Accordingly, the acoustic lens according to the present invention has a convex lens shape and an acoustic impedance close to that of a subject without using fine particles. Therefore, the acoustic lens of the present invention causes small attenuation of sound.

Furthermore, the present invention is characterized in that a material of each lens portion is a thermoplastic resin. Thus, in the production of the acoustic lens, the lens portions can be easily joined to each other. Thus, the present invention can actually provide an acoustic lens that satisfies each of the conditions such as the sound velocity while taking into consideration the joining property between lens portions.

It is considered that, according to these expression mechanism or action mechanism, the present invention can provide an acoustic lens or the like that causes little attenuation of sound and has an acoustic impedance suitable for an ultrasound probe.

DESCRIPTION OF EMBODIMENTS

Figure 1:
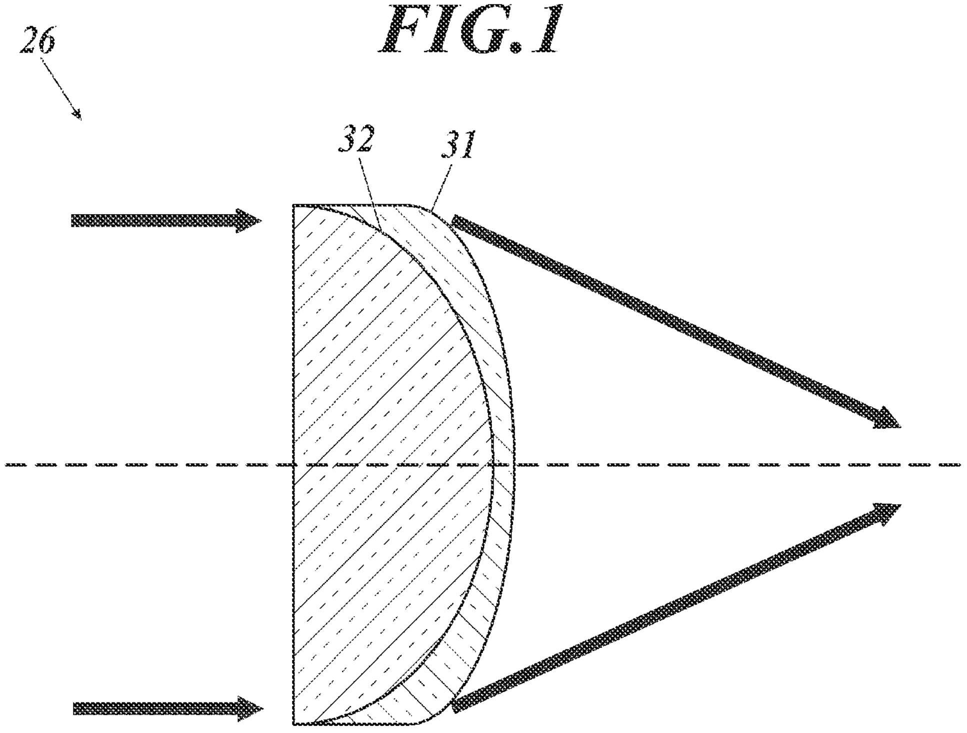
FIG. 1 This is a cross-sectional view of an acoustic lens configured such that the concave lens portion is on the subject side and the convex lens portion is on the ultrasound transducer side.

The acoustic lens of the present invention is an acoustic lens for an ultrasound probe, which is formed by joining a concave lens portion and a convex lens portion, wherein a propagation speed of an ultrasonic wave in the convex lens portion is lower than a propagation speed of an ultrasonic wave in the concave lens portion, an acoustic impedance of the lens portion for a subject side out of the concave lens portion and the convex lens portion is within a range of 1.3 to 1.8 MRayl, and materials of the concave lens portion and the convex lens portion are both thermoplastic resins.

This feature is a technical feature common to or corresponding to the following embodiments.

In the acoustic lens of the present invention, it is preferable that a lens surface that faces a subject when the acoustic lens is arranged in an ultrasound probe is a flat surface or a convex surface. Thus, the adhesiveness of the acoustic lens to the subject is improved, and the entrapment of air is prevented. Thus, the acoustic lens enables the ultrasonographic device to obtain a more satisfactory tomographic image.

In the acoustic lens according to the present invention, it is preferable that a propagation speed of ultrasonic waves in the convex lens portion is slower than a propagation speed of ultrasonic waves in the concave lens portion by 300 m/s or more. Thus, the curvature of the lens can be small, and the thickness of the lens can be reduced. Thus, attenuation of sound through the acoustic lens can be reduced. Thus, it is also possible to suppress a thickness deviation ratio of the lens, and it is possible to make the formability of the acoustic lens more favorable.

It is preferable that the thermoplastic resin that is a material of the concave lens portion of the acoustic lens of the present invention is a thermoplastic hard resin, and the thermoplastic resin that is a material of the convex lens portion is a thermoplastic elastomer. Thus, the propagation speed of ultrasonic waves in the acoustic lens becomes favorable.

The thermoplastic resin which is the material of the convex lens portion of the acoustic lens of the present invention preferably has a repulsive elastic modulus of 60% or more. Accordingly, the attenuation of sound due to the material properties of the convex lens portion can be further reduced.

In the acoustic lens according to the present invention, it is preferable that a difference in solubility parameter between at least one component contained as material(s) of the concave lens portion and at least one component contained as material(s) of the convex lens portion is 1 $(cal/cm^3)^{1/2}$ or less. Thus, the joining property between the lens portions becomes more satisfactory.

In the acoustic lens according to the present invention, it is preferable that the concave lens portion and the convex lens portion are welded to each other. Thus, attenuation of sound due to the adhesive layer is eliminated.

It is preferable that the acoustic lens of the present invention is configured such that the concave lens portion is on a side of a subject and the convex lens portion is on a side of an ultrasound transducer, and that the thermoplastic resin which is a material of the concave lens portion is a polyolefin-based thermoplastic hard resin and the thermoplastic resin which is a material of the convex lens portion is a thermoplastic elastomer containing a polyolefin-based resin component. Such an acoustic lens has a good joining property between the lens portions while satisfying conditions of acoustic impedance and a propagation speed of an ultrasonic wave.

It is preferable that the acoustic lens of the present invention is configured such that the concave lens portion faces an ultrasound transducer and the convex lens portion faces a subject, and that the thermoplastic resin which is a material of the concave lens portion is any one type of thermoplastic hard resin of a polycarbonate type, an ABS type, a polybutylene terephthalate type, and a polyamide type, and the thermoplastic resin which is a material of the convex lens portion is a thermoplastic elastomer containing at least one type of resin component of a polyester type, a polyamide type, and a polyurethane type. Such an acoustic lens has a good joining property between the lens portions while satisfying conditions of acoustic impedance and a propagation speed of an ultrasonic wave.

A method of manufacturing an acoustic lens of the present invention is a method of manufacturing the acoustic lens described in the present invention, and includes welding the concave lens portion and the convex lens portion.

In the method of manufacturing an acoustic lens of the present invention, it is preferable that the concave lens portion and the convex lens portion are welded to each other by insert molding. Accordingly, the concave lens portion and the convex lens portion can be welded without using a special molding machine.

In the method of manufacturing an acoustic lens according to the present invention, it is preferable that the concave lens portion and the convex lens portion are welded by two color molding. Thus, the process from the molding to the joining of the first lens portion can be performed in one process.

An ultrasonic probe of the present invention is an ultrasound probe including an ultrasound transducer that transmits an ultrasonic wave toward a subject and receives a reflection echo thereof, and an acoustic lens disposed on a wave transmission/reception surface side of the ultrasound transducer, in which the acoustic lens is the acoustic lens of the present invention.

The ultrasonographic device of the present invention includes the ultrasound probe of the present invention.

Hereinafter, the present invention, components thereof, and modes and aspects for carrying out the present invention will be described in detail. In the present application, "to" is used to mean that numerical values described before and after "to" are included as a lower limit value and an upper limit value.

(1) Summary of Acoustic Lens of the Present Invention

The acoustic lens of the present invention is an acoustic lens for an ultrasound probe, which is formed by joining a concave lens portion and a convex lens portion, wherein a propagation speed of an ultrasonic wave in the convex lens portion is lower than a propagation speed of an ultrasonic wave in the concave lens portion, an acoustic impedance of the lens portion for a subject side out of the concave lens portion and the convex lens portion is within a range of 1.3 to 1.8 Mrayl, and materials of the concave lens portion and the convex lens portion are both thermoplastic resins.

Since the acoustic lens of the present invention has these characteristics, both the adjustment of the acoustic impedance and the less attenuation of sound can be achieved while satisfying the conditions for focusing the ultrasonic wave. The conditions for the acoustic lens to focus the ultrasonic waves include an appropriate acoustic velocity in the acoustic lens and an appropriate shape of the acoustic lens. In addition, the acoustic lens of the present invention is superior to a conventional acoustic lens in terms of manufacturing. Specifically, the acoustic lens of the present invention can be actually provided in consideration of the joining property.

Hereinafter, the details of the present invention will be described.

(2) Shape of Acoustic Lens

An acoustic lens according to the present invention is formed by joining a concave lens portion and a convex lens portion.

A shape of a cross section of the concave lens portion is a shape in which a thickness of a central part is less than a thickness of a peripheral part (so-called concave shape). The cross-sectional shape of the convex lens portion is a shape in which the thickness of the central portion is thicker than the thickness of the peripheral portion (so-called convex shape).

Figure 2:
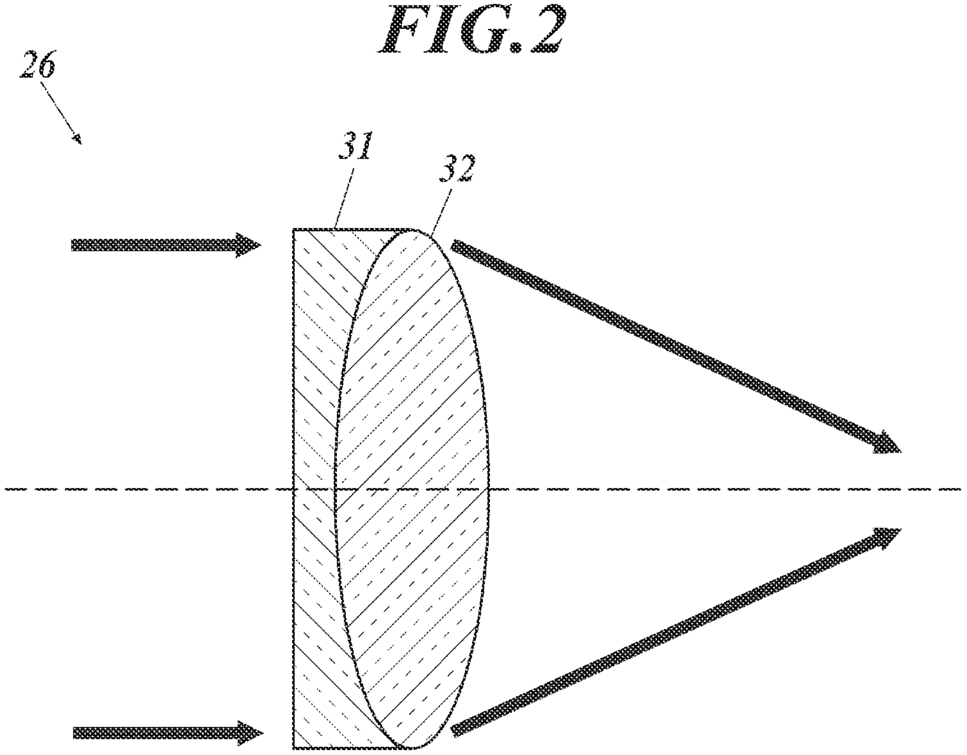
FIG. 2 This is a cross-sectional view of the acoustic lens configured such that the concave lens portion faces the ultrasound transducer and the convex lens portion faces the subject.

The configuration of the acoustic lens of the present invention may be either the configuration shown in FIG. 1 or the configuration shown in FIG. 2. The acoustic lens 26 illustrated in FIG. 1 is configured such that the concave lens portion 31 is on the subject side (right side in the drawing)

and the convex lens portion 32 is on the ultrasound transducer side (left side in the drawing) in the ultrasound probe. The acoustic lens 26 illustrated in FIG. 2 is configured such that, in the ultrasound probe, the concave lens portion 31 is on the ultrasound transducer side (left side in the drawing) and the convex lens portion 32 is on the subject side (right side in the drawing).

In FIGS. 1 and 2, arrows indicate that an ultrasonic wave transmitted from the ultrasound transducer side is refracted by the acoustic lens and is focused on the subject side.

The thickness and curvature of each lens portion are not particularly limited and can be designed according to the use. From a viewpoint of sound attenuation, it is preferable that the thickness of each lens portion is thin.

In the acoustic lens of the present invention, it is preferable that a lens surface that faces a subject when the acoustic lens is disposed in an ultrasound probe is a flat surface or a convex surface. Thus, the adhesiveness of the acoustic lens to the subject is improved, and the entrapment of air is prevented. Thus, the acoustic lens enables the ultrasonographic device to obtain a more satisfactory tomographic image.

(3) Thermoplastic Resin

The acoustic lens of the present invention is characterized in that both the concave lens portion and the convex lens portion are made of a thermoplastic resin. In the manufacturing process of such an acoustic lens, the lens portions can be easily joined to each other by welding or adhesion using an adhesive.

The thermoplastic resin refers to a resin having thermoplasticity. In the present invention, among resins, a resin that does not exhibit rubber elasticity is referred to as a hard resin, and a resin that exhibits rubber elasticity is referred to as an elastomer. That is, the thermoplastic resin includes a thermoplastic hard resin and a thermoplastic elastomer.

The material of each lens portion only needs to contain a thermoplastic resin as a main component, and may contain other additives in a small amount within a range where thermoplasticity is not impaired.

The elastomer is constituted of a soft segment and a hard segment. The soft segment is a rubber component which provides elasticity to the thermoplastic elastomer. The hard segment is a component which flows at a high temperature but plays a restricting role of inhibiting deformation at normal temperature. The soft segment and the hard segment may be in the form of a block copolymer in which they are chemically joined together, or may be in the form of a polymer alloy in which they are simply mixed together without being chemically joined together.

In a case where the elastomer is a polymer alloy type, a block copolymer type elastomer may be used as the soft segment.

The thermoplastic hard resin includes, for example, thermoplastic hard resins such as polyolefin-based, polycarbonate-based, acrylonitrile butadiene styrene (ABS)-based, polybutylene terephthalate-based, and polyamide-based resins.

Specific examples of the thermoplastic hard resin include an olefin-based resin, an acryl-styrene-acrylonitrile copolymer, an acrylonitrile-butadiene-styrene copolymer, a methacrylic-styrene copolymer, a nylon resin, a butylene terephthalate resin, an ethylene terephthalate resin, a styrene resin, a styrene-acrylonitrile copolymer, and a carbonate resin. Examples of the olefin-based resin include low-density polyethylene, linear low-density polyethylene, high-density polyethylene, crystalline propylene homopolymer, crystalline ethylene-propylene copolymer, polymethylpentene, and the like.

The thermoplastic elastomer includes, for example, a thermoplastic elastomer containing, as a soft segment or a hard segment, a resin component such as a polyolefin-based, polyester-based, polyamide-based or polyurethane-based resin component.

Specific examples of the thermoplastic elastomer include an ester-based elastomer, an olefin-based elastomer, an amide-based elastomer, a urethane-based elastomer, a styrene-based elastomer, and an acrylic elastomer.

(4) Solubility Parameter (SP Value)

In the acoustic lens according to the present invention, it is preferable that a difference in solubility parameter between at least one of the components contained as materials of the concave lens portion and at least one kind of the components contained as materials of the convex lens portion is 1 $(cal/cm^3)^{1/2}$ or less. Thus, the joining property between the lens portions becomes more satisfactory.

The solubility parameter is also referred to as an SP value (solubility parameter), and is a value that can be used as an index of solubility or compatibility of a solvent or a resin. When the difference in the solubility parameter is small, the solubility and the compatibility become favorable, and thus the joining property of the thermoplastic resins becomes favorable.

In the case where the material of the lens portion is a hard resin, when the material of the lens portion contains a single hard resin as a component, at least one kind of the components contained in the material refers to the hard resin. When a plurality of kinds of hard resins are used as the components, at least one kind of the components contained in the material refers to at least one kind of the components.

In a case where the material of the lens portion is an elastomer, the at least one kind of component among components contained in the material refers to at least one of the soft segment and the hard segment that are components contained in the elastomer. In addition, in a case where there are a plurality of kinds of soft segments or hard segments, at least one kind of component among components contained in the material refers to at least one kind among the plurality of kinds.

(5) Joining

Both the concave lens portion and the convex lens portion according to the present invention use a thermoplastic resin as the material. Accordingly, in manufacturing the acoustic lens according to the present invention, the lens portions can be easily joined to each other by welding or joining using an adhesive.

(5.1) Welding

It is preferable to join the lens portions to each other by welding from the viewpoint of productivity of the acoustic lens. In addition, since joining of the lens portions by welding does not require an adhesive layer made of an adhesive or a primer, it is also preferable in that there is no influence on the attenuation of sound due to the adhesive layer.

As a molding method of the acoustic lens in which the lens portions are welded to each other, insert molding or two color molding is preferable.

In the insert molding, one of the molded lens portions is inserted into a mold, and a resin material of the other lens portion is injected into a space in the mold, whereby the lens portions can be welded to each other. Insert molding is preferable from the viewpoint that the lens portions can be welded to each other without using a special molding machine.

In the two color molding, after the material of one of the lens portions is injected and filled in the mold, the material of the other lens portion is filled in the mold, so that the lens portions can be welded to each other. Two color molding is preferable in that procedures from the molding of the first lens portion to the joining can be performed in one process.

Two color molding includes methods such as a rotary method and a core-back method, and the acoustic lens of the present invention can be molded by any method.

(5.2) Joining with Adhesive

The concave lens portion and the convex lens portion according to the present invention can also be joined with an adhesive. The joining of the lens portions to each other with an adhesive is preferable in that the lens portions can be integrated with each other without a molding machine or the like for welding as long as the molded lens portions are present.

The type of the adhesive is not particularly limited, and a general adhesive that can adhere thermoplastic resins to each other can be used.

In addition, in terms of the joining property between the lens portions, it is preferable to apply a primer before adhesion with an adhesive. The primer is an adhesion aid used for a pretreatment of adhesive application. By using a primer suitable for the type of an object to be joined or an adhesive, it is possible to enhance the joining property between the lens portions.

In consideration of the influence of the adhesive layer on attenuation of sound and productivity, welding is more preferable than joining using an adhesive.

(6) Comparison of Joining Property of Lens Portions

In order to compare the joining property between the lens portions, as an example, evaluation results of the joining property between various thermoplastic elastomers and thermosetting elastomers (silicone rubber) with respect to a thermoplastic hard resin are shown in Table I. Table II shows details of the materials used for the evaluation of the joining property.

TABLE I

| | | Welding | | Joining by Adhesive | | Joining by Adhesive and Primer | |
|---|---|---|---|---|---|---|---|
| No. | First Layer Material | Joining with TPX | Joining with PC | Joining with TPX | Joining with PC | Joining with TPX | Joining with PC |
| 1 | Styrene-based Elastomer 1 | ○ | x | x | x | ○ | ○ |
| 2 | Styrene-based Elastomer 2 | ○ | x | x | x | ○ | ○ |
| 3 | Styrene-based Elastomer 3 | x | Δ | x | ○ | ○ | ○ |
| 4 | Olefin-based Elastomer | ○ | x | x | x | ○ | ○ |
| 5 | Ester-based Elastomer | x | ○ | x | ○ | ○ | ○ |
| 6 | Amide-based Elastomer | x | ○ | x | ○ | ○ | ○ |
| 7 | Urethane-based Elastomer | x | ○ | x | ○ | ○ | ○ |
| 8 | Silicone Rubber | x | x | x | x | Δ | Δ |

TABLE II

| Material | Classification | Main Soft Segment | Main Hard Segment | Type | SP Value $(cal/cm^3)^{1/2}$ | Remarks |
|---|---|---|---|---|---|---|
| Styrene-based Elastomer 1 | Thermoplastic Elastomer | Styrene-based | Polyethylene | Alloy | 8 | TPS-test Product made by Kuraray Plastics Co., Ltd. |
| Styrene-based Elastomer 2 | Thermoplastic Elastomer | Styrene-based | Polypropylene | Alloy | 8 | TPS-SR04 made by Mitsubishi Chemical Corp. |
| Styrene-based Elastomer 3 | Thermoplastic Elastomer | Butadiene | Styrene-based | Copolymer | 9 | TPS-P1083 made by Asahi Kasei Corp. |
| Olefin-based Elastomer | Thermoplastic Elastomer | Ethylene-propylene Diene Rubber | Polypropylene | Alloy | 8 | TPO-3655B made by Mitsubishi Chemical Corp. |

TABLE II-continued

| Material | Classification | Main Soft Segment | Main Hard Segment | Type | SP Value $(cal/cm^3)^{1/2}$ | Remarks |
|---|---|---|---|---|---|---|
| Ester-based Elastomer | Thermoplastic Elastomer | Ester-based | Polyester | Copolymer | 10 | TPEE-A1800N made by Mitsubishi Chemical Corp. |
| Amide-based Elastomer | Thermoplastic Elastomer | Polyether | Polyamide | Copolymer | 10.5 | TPA-3533SA0 made by Arkema S.A. |
| Urethane-based Elastomer | Thermoplastic Elastomer | Urethane-based | Polyester | Copolymer | 10 | TPU-ET880-50 made by BASF Japan Ltd. |
| Silicone Rubber | Thermosetting Elastomer | — | — | — | 7.4 | — |
| Polymethylpentene (TPX) | Thermoplastic Hard Resin | — | — | — | 7.5 | TPX-MX0020 made by Mitsui Chemicals, Inc. |
| Polycarbonate (PC) | Thermoplastic Hard Resin | — | — | — | 10 | PC-H3000R made by Mitsubishi Engineering-Plastics Corp. |

The column "Joining with TPX" in Table I describes the evaluation when polymethylpentene (TPX) is used for the second layer sheet. Further, in the column of "Joining with PC", evaluation when polycarbonate (PC) is used is described.

The column of "SP value" in Table II describes the solubility parameter of a component contributing to welding among the components contained in the thermoplastic resin. In the column of "SP value" of the silicone rubber in Table II, the solubility parameter of the material itself is simply described.

The joining property was evaluated as follows. An injection-molding machine (SE 50DU, manufactured by Sumitomo Heavy Industries, Ltd) was used to produce the evaluation sheet. The melting temperature of the resin and the temperature of the mold at the time of producing the evaluation sheet were set to the temperature recommended by the manufacturer of each resin material.

[Preparation of Composite Sheet for Evaluation of Welding]

A molten resin serving as a material of a sheet for a first layer was injected into a mold of 35 mm (length)×35 mm (width)×1 mm (thickness). Thereafter, the molten resin was cooled and solidified. As a result, a first layer sheet was produced.

The prepared first layer sheet having a thickness of 1 mm was set in a mold of 35 mm (length)×35 mm (width)×2 mm (thickness). A molten resin serving as a material for a second layer sheet was injected into the space in the mold. Thereafter, the molten resin was cooled and solidified. Thus, a composite sheet for evaluation of welding was produced.

[Production of Composite Sheet for Evaluation of Joining with Adhesive]

Each of the molten resins was injected into a mold of 35 mm (length)×35 mm (width)×1 mm (thickness). Thereafter, these molten resins were cooled and solidified. As a result, a first layer sheet and a second layer sheet were separately produced.

The first layer sheet and the second layer sheet produced above were joined with an adhesive containing cyanoacrylate as a main component (PPX set manufactured by Cemedine Co., Ltd). As a result, a composite sheet for evaluating joining with an adhesive was produced.

[Production of Composite Sheet for Evaluation of Joining with Adhesive and Primer]

Each of the molten resins was injected into a mold of 35 mm (length)×35 mm (width)×1 mm (thickness). Thereafter, these molten resins were cooled and solidified. As a result, a first layer sheet and a second layer sheet were separately produced.

A primer containing N-heptane as a main component (PPX set manufactured by Cemedine Co., Ltd) was applied to each of the first layer sheet and the second layer sheet produced as described above. The first sheet and the second sheet to which the primer was applied were joined to each other with an adhesive containing cyanoacrylate as a main component (PPX set manufactured by Cemedine Co., Ltd). As a result, a composite sheet for evaluating joining with the adhesive and the primer was produced.

[Production of First Layer Sheet Made of Silicone Rubber]

In the production of the composite sheet for evaluation, the first layer sheet using silicone rubber as a material was produced according to the following procedure. First, 0.5 parts by mass of 2,5-dimethyl-2,5-di (t-butylperoxy) hexane as a vulcanizing agent was mixed with 100 parts by mass of dimethylpolysiloxane (KE742, manufactured by Shin-Etsu Chemical Corporation). This mixture was press-molded at 165° C. for 10 minutes. Thereafter, the press-molded mixture was further subjected to secondary vulcanization at 200° C. for 2 hours. Thus, a first layer sheet containing silicone rubber as a material was produced. The first layer sheet containing silicone rubber as a material was molded so as to have a thickness of 1 mm.

[Evaluation of Joining Property]

The joining property of each of the prepared composite sheets for evaluation was evaluated as follows, and listed in Table I.

- ○: The first layer sheet and the second layer sheet can be joined to each other and are not peeled off even when pulled by hand
- Δ: Although the first layer sheet and the second layer sheet are joined to each other, they are peeled off when pulled by hand
- x: The first layer sheet and the second layer sheet are not joined.

As shown in Table I, the joining property between the thermoplastic resins is better than the joining property between the silicone rubber and the thermoplastic resin. Silicone rubber and thermoplastic resin cannot be joined together with an adhesive alone. In contrast, thermoplastic resins can be joined to each other with only an adhesive by appropriately combining materials. Further, even when a primer is used for joining with an adhesive, the silicone rubber and the thermoplastic resin are peeled off when pulled by hand In contrast, thermoplastic resins can be satisfactorily joined to each other. Further, the silicone rubber and the thermoplastic resin cannot be joined by welding. On the other hand, the thermoplastic resins can be welded by appropriately combining materials.

(7) Propagation Speed of Ultrasonic Wave

In the acoustic lens according to the present invention, a propagation speed of an ultrasonic wave in the convex lens portion is slower than a propagation speed of an ultrasonic wave in the concave lens portion. This is for focusing the ultrasonic wave.

A difference in propagation speed of the ultrasonic wave between the convex lens portion and the concave lens portion is preferably as large as possible, and is preferably 300 m/s or more. As the difference in propagation speed of the ultrasonic wave between the convex lens portion and the concave lens portion is larger, a refraction angle of the ultrasonic wave on the joining surface becomes larger and the curvature is smaller, and therefore, it is easier to focus the sound. Further, by reducing the curvature, the thickness of the lens can be reduced. By reducing the thickness of the lens, the attenuation of sound can be reduced.

The relationship between the propagation speed of the ultrasonic wave in the concave lens portion and the convex lens portion and the propagation speed of the ultrasonic wave in the subject can be appropriately adjusted, and is not particularly limited. However, in order to focus the ultrasonic wave, the propagation speed of the ultrasonic wave in the concave lens portion needs to be higher than the propagation speed of the ultrasonic wave in the subject.

In practice, the propagation speed of the ultrasonic waves in the concave lens portion is preferably higher than the propagation speed of the ultrasonic waves in the living body, and thus is preferably 1530 m/s or more.

In addition, in terms of propagation speed of the ultrasonic wave, it is preferable to use a thermoplastic hard resin as a material of the concave lens portion and a thermoplastic elastomer as a material of the convex lens portion.

(8) Acoustic Impedance

In the acoustic lens of the present invention, an acoustic impedance of the lens portion for the subject side among the concave lens portion and the convex lens portion is within a range of 1.3 to 1.8 MRayl. Accordingly, the reflection of the ultrasonic waves at an interface between the acoustic lens and the subject can be reduced.

In the acoustic lens according to the present invention, it is preferable that a difference in acoustic impedance between the lens portion for the subject side and the lens portion for the ultrasound transducer side is 0.6 MRayl or less. Accordingly, reflection of ultrasonic waves at the interface between the lens portions can be reduced.

The acoustic impedance is a constant specific to a substance and represented by the following expression.

$$\text{acoustic impedance } Z\ [\text{MRayl}] = \text{density } \rho\ [\text{kg/m}^3] \times \text{sound velocity } C\ [\text{m/s}]$$

The unit of acoustic impedance is generally "MRayl". 1 Mrayl is $1.0\times10^6$ kg·m$^2$/s.

(9) Repulsive Elastic Modulus

Figure 3:
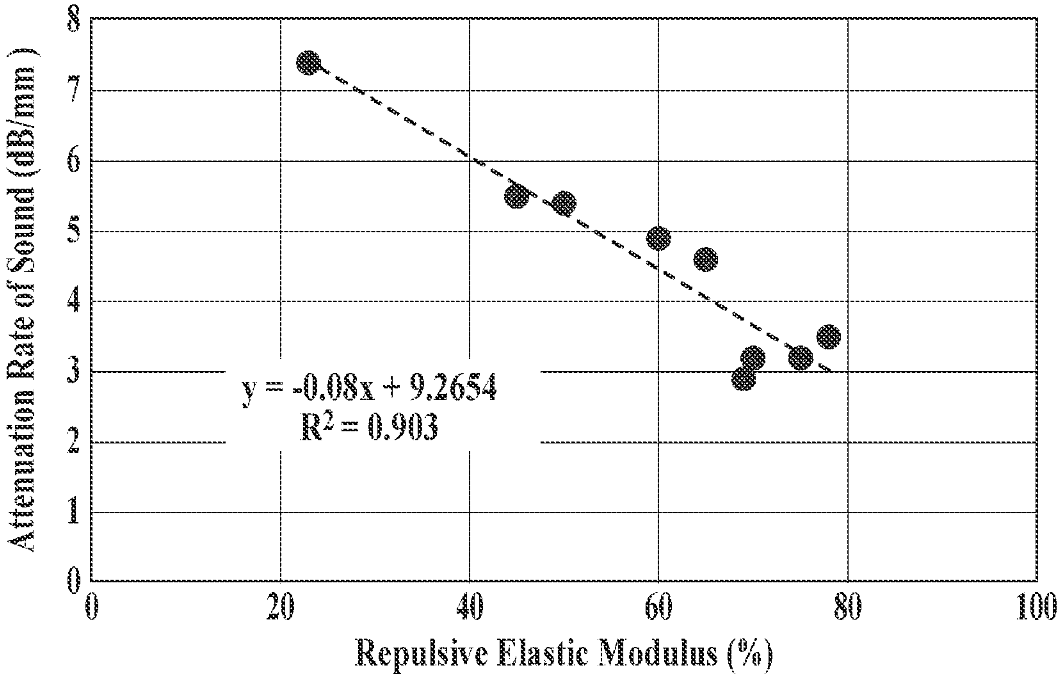
FIG. 3 This is a graph illustrating a relationship between a repulsive elastic modulus of a thermoplastic elastomer and an attenuation rate of sound.

The repulsive elastic modulus of the thermoplastic resin which is the material of the convex lens portion of the acoustic lens according to the present invention is preferably 60% or more. As described above, it is preferable to use a thermoplastic elastomer as the material of the convex lens portion from the viewpoint of the propagation speed of ultrasonic waves. The thermoplastic elastomer having a larger repulsive elastic modulus tends to cause less attenuation of sound due to material properties (see Table III, FIG. 3). Therefore, as the repulsive elastic modulus of the thermoplastic resin which is the material of the convex lens portion is larger, the attenuation of sound due to the material properties of the convex lens portion can be reduced. In consideration of practicality of the acoustic lens, it is preferable that a repulsive elastic modulus of the thermoplastic resin which is a material of the convex lens portion is 60% or more.

(10) Acoustic Characteristic Evaluation

Examples of materials that can be used for the lens portion are shown in Table III. The examples shown in Table III are not intended to limit the materials that can be used for the convex lens portion.

TABLE III

| Material | Classification | Density (g/cm$^3$) | Sound Speed (m/s) | Acoustic Impedance (MRayl) | Attenuation Rate (dB/mm) | Repulsive Elastic Modulus (%) | Remarks |
|---|---|---|---|---|---|---|---|
| Polymethylpentene | Thermoplastic Hard Resin | 0.83 | 2033 | 1.69 | 1.9 | — | TPX-MX0020 made by Mitsui Chemicals, Inc. |
| Styrene-based Elastomer 2 | Thermoplastic Elastomer | 0.89 | 1558 | 1.39 | 3.5 | 78 | TPS-SR04 made by Mitsubishi Chemical Corp. |
| Styrene-based Elastomer 4 | Thermoplastic Elastomer | 0.92 | 1918 | 1.76 | 7.4 | 23 | TPS-T3867C made by Mitsubishi Chemical Corp. |
| Styrene-based Elastomer 5 | Thermoplastic Elastomer | 0.89 | 1626 | 1.44 | 5.5 | 45 | TPS-CJ001 made by Kuraray Plastics Co., Ltd. |
| Styrene-based Elastomer 6 | Thermoplastic Elastomer | 0.89 | 1589 | 1.41 | 4.6 | 65 | TPS-JH40N made by Kuraray Plastics Co., Ltd. |
| Styrene-based Elastomer 7 | Thermoplastic Elastomer | 0.88 | 1508 | 1.33 | 3.2 | 70 | TPS-T320C made by Mitsubishi Chemical Corp. |

TABLE III-continued

| Material | Classification | Density ($g/cm^3$) | Sound Speed (m/s) | Acoustic Impedance (MRayl) | Attenuation Rate (dB/mm) | Repulsive Elastic Modulus (%) | Remarks |
|---|---|---|---|---|---|---|---|
| Olefin-based Elastomer | Thermoplastic Elastomer | 0.88 | 1565 | 1.38 | 5.4 | 50 | TPO-3655B made by Mitsubishi Chemical Corp. |
| Ester-based Elastomer | Thermoplastic Elastomer | 1.07 | 1572 | 1.68 | 3.2 | 75 | TPEE-A1800N made by Mitsubishi Chemical Corp. |
| Amide-based Elastomer | Thermoplastic Elastomer | 1.00 | 1591 | 1.59 | 2.9 | 69 | TPA-3533SA0 made by Arkema S.A. |
| Urethane-based Elastomer | Thermoplastic Elastomer | 1.09 | 1664 | 1.81 | 4.9 | 60 | TPU-ET880-50 made by BASF Japan Ltd. |

Each value described in Table III was obtained by producing a measurement sheet as follows.

[Production of Measurement Sheet]

Molten resin as a material was injected into a mold of 35 mm (length)×35 mm (width)×1 mm (thickness). Thereafter, the molten resin was cooled and solidified. Thus, a measurement sheet was produced.

An injection-molding machine (SE 50DU, manufactured by Sumitomo Heavy Industries, Ltd) was used to produce the measurement sheet. The melting temperature of the resin and the temperature of the mold at the time of producing the measurement sheet were set to the temperatures recommended by the manufacturer of each resin material.

[Density] The densities were measured at 25° C. according to JIS C 2123.

[Sound Speed (Propagation Speed of Ultrasonic Wave)]

The sound speed was measured at 25° C. with a sound speed measuring device (SINGAROUND SONIC SPEED MEASURING DEVICE UVM-2 manufactured by Ultrasonic Engineering Co., Ltd).

[Acoustic Impedance]

From the density and the sound velocity measured as described above, the acoustic impedance was determined by the following expression.

$$Z=\rho\times C$$

Z: acoustic impedance [MRayl]

ρ: density [$kg/m^3$]

C: sound velocity [m/s]

[Attenuation Factor of Sound]

The measurement sheet was placed in a water tank filled with water at 25° C., and in this state, 15 MHz ultrasonic waves were generated in the water. An ultrasonic pulser/receiver JPR-10C (manufactured by JAPAN Probe Co., Ltd) was used to generate ultrasonic waves. The amplitude of the ultrasonic wave before transmission through the measurement sheet and the amplitude of the ultrasonic wave after transmission through the measurement sheet were measured. From the measured amplitudes, an attenuation rate was obtained by the following equation.

$$P_x=P_0e^{-\alpha x}$$

$P_x$: Amplitude after transmission $P_0$: Amplitude before transmission e: natural logarithm α: attenuation factor [dB/mm]

x: transmission distance [mm]

(11) Preferred Combination of Materials

A preferable combination of materials used in the acoustic lens of the present invention will be described.

The acoustic lens shown in FIG. 1 is configured such that the concave lens portion is on the subject side and the convex lens portion is on the ultrasound transducer side. It is preferable that such an acoustic lens includes a polyolefin-based thermoplastic hard resin as the thermoplastic resin which is the material of the concave lens portion, and includes a thermoplastic elastomer containing a polyolefin-based resin component as the thermoplastic resin which is the material of the convex lens portion. The reason for this is as follows.

The material of the lens portion for the subject side needs to have an acoustic impedance of 1.3 to 1.8 MRayl. When the lens portion for the subject side is the concave lens portion, the material is preferably a polyolefin-based thermoplastic hard resin in consideration of the fact that the material is a thermoplastic resin and an appropriate propagation velocity of ultrasonic waves in addition to an appropriate acoustic impedance. In consideration of the joining property with the material of the concave lens portion, the material of the convex lens portion for the ultrasound transducer side is preferably a thermoplastic elastomer containing a polyolefin-based resin component.

The acoustic lens shown in FIG. 2 is configured such that the concave lens portion faces the ultrasound transducer and the convex lens portion faces the subject. It is preferable that such an acoustic lens includes any one kind of thermoplastic hard resin of polycarbonate, ABS, polybutylene terephthalate, and polyamide as the thermoplastic resin which is the material of the concave lens portion, and includes a thermoplastic elastomer containing at least any one kind of resin component of polyester, polyamide, and polyurethane as the thermoplastic resin which is the material of the convex lens portion. The reason for this is as follows.

The material of the lens portion for the subject side needs to have an acoustic impedance of 1.3 to 1.8 MRayl. When the lens portion for the subject side is the convex lens portion, in consideration of the fact that the material is a thermoplastic resin and an appropriate propagation velocity of ultrasonic waves in addition to an appropriate acoustic impedance, its material is preferably a thermoplastic elastomer containing at least one kind of resin component of a polyester-based resin, a polyamide-based resin, and a polyurethane-based resin. In addition, in consideration of the joining property with the material of the convex lens portion, the material of the concave lens portion for the ultrasound transducer side is preferably one kind of thermoplastic hard resin of a polycarbonate-based resin, an ABS-based resin, a polybutylene terephthalate-based resin, and a polyamide-based resin.

(12) Ultrasound Probe

An ultrasound probe according to the invention includes an ultrasound transducer and the acoustic lens according to the present invention. The ultrasound transducer transmits an ultrasonic wave toward the subject and receives a reflected echo from the subject. The acoustic lens is arranged on a wave transmission/reception surface side of the ultrasound transducer.

The ultrasound transducer is an element (piezoelectric element) having a piezoelectric material, capable of converting an electric signal into mechanical vibration and converting the mechanical vibration into an electric signal, capable of transmitting and receiving ultrasonic waves, and having a pyroelectric effect.

The piezoelectric material is a material containing a piezoelectric body capable of converting an electric signal into mechanical vibration and converting mechanical vibration into an electric signal. As the piezoelectric body, lead zirconate titanate (PZT)-based ceramics, other piezoelectric ceramics, a piezoelectric single crystal formed of a solid solution-based single crystal, quartz, Rochelle salt, an organic polymer piezoelectric material, or the like can be used. Examples of other piezoelectric ceramics include lead titanate and lead metaniobate. Examples of the solid solution single crystal include a solid solution single crystal of lithium niobate, a solid solution single crystal of lead zinc niobate and lead titanate, and a solid solution single crystal of lead magnesium niobate and lead titanate. Examples of the organic polymer piezoelectric material include polyvinylidene fluoride (PVDF), a vinylidene fluoride-based copolymer, polyvinylidene cyanide (PVDCN), a vinylidene cyanide-based copolymer, odd-numbered nylon, aromatic nylon, alicyclic nylon, polyhydroxycarboxylic acid, a cellulose-based derivative, and polyurea. The vinylidene fluoride-based copolymer is, for example, polyvinylidene fluoride-ethylene trifluoride (P (VDF-TrFE)). Polyvinylidene fluoride-trifluoroethylene is a copolymer of vinylidene fluoride (VDF) and trifluoroethylene (TrFE). Polyvinylidene cyanide (PVDCN) is a polymer of vinylidene cyanide (VDCN). Examples of odd-numbered nylons include nylon 9, nylon 11, and the like. Examples of the polyhydroxycarboxylic acid include polylactic acid and polyhydroxybutyrate.

The thickness of the piezoelectric material is, for example, in a range of 100 to 500 μm. The ultrasound transducer is used in a state where an input/output (I/O) electrode and a ground (GND) electrode are attached to both surfaces thereof.

The configuration of the ultrasound probe other than the acoustic lens and the ultrasound transducer is not particularly limited. The ultrasound probe can be configured as illustrated in FIG. 4, for example.

Figure 4:
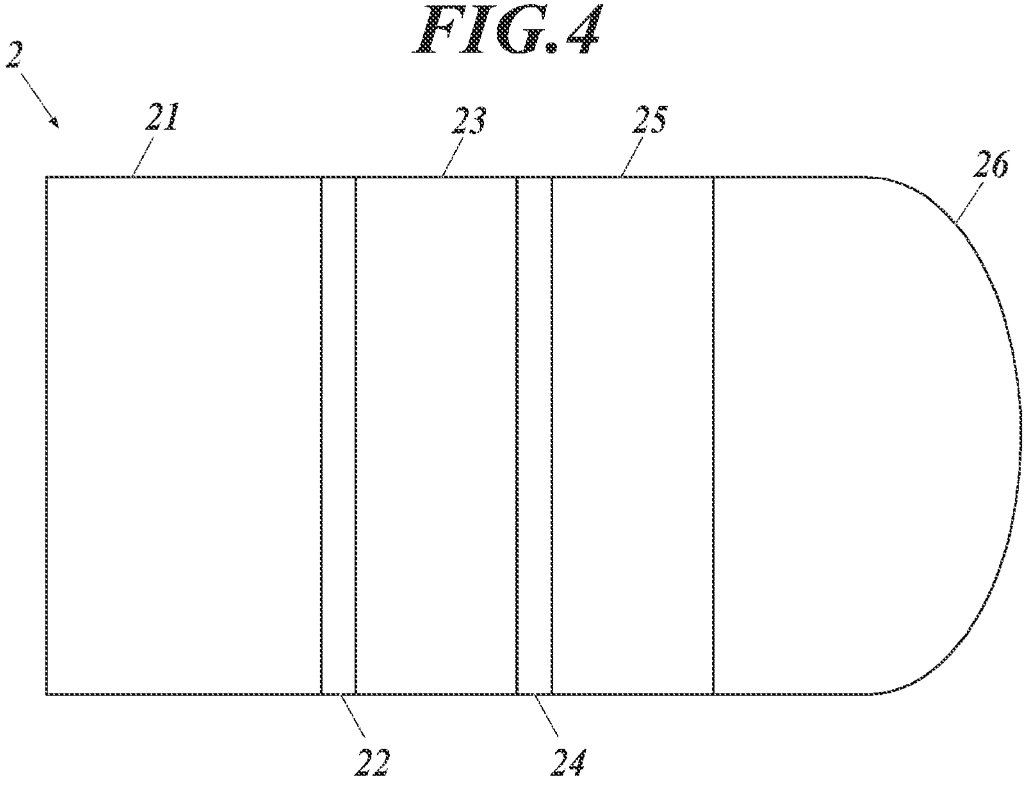
FIG. 4 This is a schematic cross-sectional view of an ultrasound probe.

The ultrasound probe 2 illustrated in FIG. 4 includes a back layer 21, an input/output (I/O) electrode 22 as a first electrode, an ultrasound transducer (piezoelectric element) 23, a ground (GND) electrode 24 as a second electrode, an acoustic matching layer 25, and an acoustic lens 26.

(13) Ultrasonographic Device

The ultrasonographic device of the present invention includes the ultrasound probe of the present invention.

The configuration of the ultrasonographic device other than the ultrasound probe is not particularly limited. The ultrasonographic device can be configured as illustrated in FIG. 5, for example.

Figure 5:
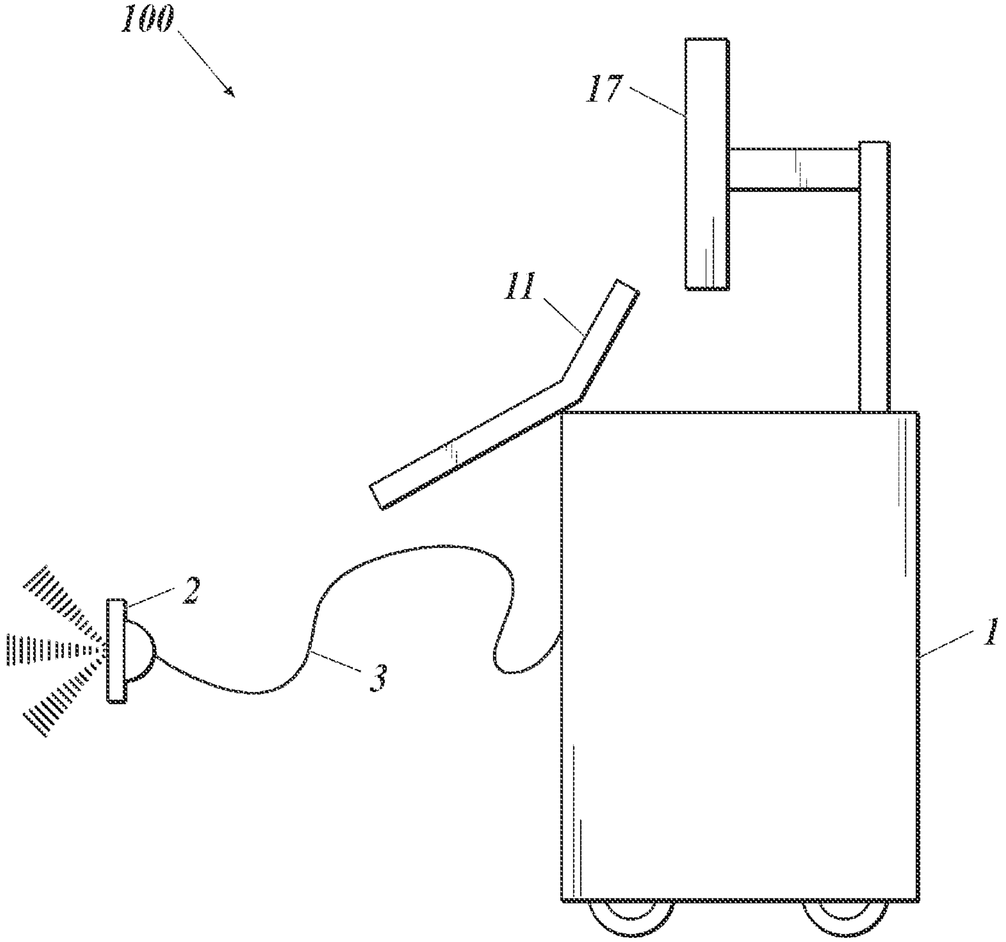
FIG. 5 This is a schematic diagram of an ultrasonographic device.

The ultrasonographic device 100 illustrated in FIG. 5 includes an ultrasonographic device main body 1 and an ultrasound probe 2. The ultrasonographic device main body 1 is connected to the ultrasound probe 2 via a cable 3. The ultrasonographic device main body 1 transmits a drive signal of an electric signal to the ultrasound probe 2. The drive signal causes the ultrasound probe 2 to transmit a transmission ultrasonic wave to the subject. The ultrasound probe 2 receives reflected ultrasonic waves from the inside of the subject. The ultrasound probe 2 generates a reception signal, which is an electric signal, in accordance with a reflected ultrasonic wave from the inside of the subject. The ultrasonographic device main body 1 images the internal state of the subject as ultrasound image data based on the reception signal. The ultrasonographic device main body 1 includes an operation input unit 11 and a display part 17.

INDUSTRIAL APPLICABILITY

The present invention can be used for an acoustic lens that causes little attenuation of sound and has an acoustic impedance that is appropriate for an ultrasound probe. The present invention can be used for a method of manufacturing the acoustic lens. The present invention can be used for an ultrasound probe and an ultrasonographic device including the acoustic lens.

REFERENCE SIGNS LIST

1 ULTRASONOGRAPHIC DEVICE MAIN BODY
2 ULTRASOUND PROBE
3 CABLE
11 OPERATION INPUT UNIT
17 DISPLAY PART
21 BACK LAYER
22 I/O ELECTRODE
23 ULTRASOUND TRANSDUCER
24 GND ELECTRODE
25 ACOUSTIC MATCHING LAYER
26 ACOUSTIC LENS
31 CONCAVE LENS PORTION
32 CONVEX LENS PORTION
100 ULTRASONOGRAPHIC DEVICE

The invention claimed is:

1. An acoustic lens of an ultrasound probe, comprising:
a concave lens portion and a convex lens portion that are joined to each other, the concave lens portion being on a side of a subject of the convex lens portion,
wherein a propagation speed of an ultrasonic wave in the convex lens portion is slower than a propagation speed of an ultrasonic wave in the concave lens portion,
wherein an acoustic impedance of a lens portion on the side of the subject of the concave lens portion and the convex lens portion is within a range of 1.3 MRayl to 1.8 MRayl,
wherein a material of the concave lens portion is a thermoplastic resin, and a material of the convex lens portion is a thermoplastic resin, and
wherein a lens surface facing the subject of the acoustic lens disposed in an ultrasound probe is a convex surface, and wherein the concave lens portion does not contact an acoustic matching layer that is in contact with the convex lens portion on an ultrasound transducer side of the ultrasound probe.

2. The acoustic lens according to claim 1, wherein a propagation speed of an ultrasonic wave through the convex lens portion is slower than a propagation speed of an ultrasonic wave through the concave lens portion by 300 m/s or more.

3. The acoustic lens according to claim 1, wherein a thermoplastic resin as a material of the concave lens portion is a thermoplastic hard resin, and a thermoplastic resin as a material of the convex lens portion is a thermoplastic elastomer.

4. The acoustic lens according to claim 1, wherein a repulsive elastic modulus of a thermoplastic resin as a material of the convex lens portion is 60% or more.

5. The acoustic lens according to claim 1, wherein a difference in solubility parameter between at least one component contained as a material of the concave lens portion and at least one component contained as a material of the convex lens portion is 1 $(cal/cm^3)^{1/2}$ or less.

6. The acoustic lens according to claim 1, wherein the concave lens portion and the convex lens portion are welded.

7. The acoustic lens according to claim 1, wherein the concave lens portion is configured to face the subject, wherein the convex lens portion is configured to face an ultrasound transducer, wherein a thermoplastic resin as a material of the concave lens portion is a polyolefin-based thermoplastic hard resin, and wherein a thermoplastic resin as a material of the convex lens portion is a thermoplastic elastomer containing a polyolefin-based resin component.

8. The acoustic lens according to claim 1, wherein the concave lens portion is configured to face an ultrasound transducer, wherein the convex lens portion is configured to face the subject, wherein a thermoplastic resin as a material of the concave lens portion is a thermoplastic hard resin of a polycarbonate-based resin, an ABS-based resin, a polybutylene terephthalate-based resin, and a polyamide-based resin, and wherein a thermoplastic resin as a material of the convex lens portion is a thermoplastic elastomer containing at least one resin component of a polyester-based resin, a polyamide-based resin, and a polyurethane-based resin.

9. A method for manufacturing the acoustic lens according to claim 1, the method comprising:

welding of the concave lens portion and the convex lens portion to each other.

10. The method for manufacturing the acoustic lens according to claim 9, wherein the concave lens portion and the convex lens portion are welded to each other by insert molding.

11. The method for manufacturing the acoustic lens according to claim 9, wherein the concave lens portion and the convex lens portion are welded to each other by two color molding.

12. An ultrasound probe comprising:

an ultrasound transducer that transmits an ultrasonic wave toward a subject and receives a reflected echo from the subject; and an acoustic lens that is arranged facing a transmission/reception surface of the ultrasound transducer;

wherein the acoustic lens is the acoustic lens according to claim 1.

13. An ultrasonographic device comprising the ultrasound probe according to claim 12.

* * * * *